United States Patent [19]

Kitchens

[11] Patent Number: 4,845,580
[45] Date of Patent: Jul. 4, 1989

[54] A.C.-D.C. SPIKE ELIMINATING BANDPASS FILTER

[76] Inventor: William B. Kitchens, P.O. Box 43471, Birmingham, Ala. 35243

[21] Appl. No.: 90,154

[22] PCT Filed: Jul. 21, 1987

[86] PCT No.: PCT/US87/01674
§ 371 Date: Jul. 21, 1987
§ 102(e) Date: Jul. 21, 1987

[87] PCT Pub. No.: WO88/01800
PCT Pub. Date: Mar. 10, 1988

[51] Int. Cl.[4] .............................................. H02H 3/20
[52] U.S. Cl. ...................................... 361/91; 361/56; 361/111; 361/119; 361/120
[58] Field of Search .................. 361/56, 86, 91, 111, 361/117, 118, 119

[56] References Cited

U.S. PATENT DOCUMENTS

| | | | |
|---|---|---|---|
| 4,455,586 | 6/1984 | Macartney | 361/91 X |
| 4,563,720 | 1/1986 | Clark | 361/91 X |
| 4,584,622 | 4/1986 | Crosby et al. | 361/56 |
| 4,587,588 | 5/1986 | Goldstein | 361/91 X |
| 4,675,722 | 6/1987 | Epstein | 361/91 X |
| 4,760,485 | 7/1988 | Ari et al. | 361/118 X |

*Primary Examiner*—Derek S. Jennings

[57] ABSTRACT

A spike elimination circuit for A.C. and D.C. power sources comprises two gas tube and/or two semiconductor voltage limiting devices before a Bandpass Filter. The Bandpass Filter consists of 2 capacitors to ground and an inductor in series with the line. The spike eliminator can be portable, mobile, or hard wired for the protection of home controls and electronics, telecommunications, commercial and industrial controls and the computer field and others.

4 Claims, 5 Drawing Sheets

117 VAC 1Ph

230 VAC 3Ph

408 YAC 3 Phase

220 VAC 1 Ph or 3Ph

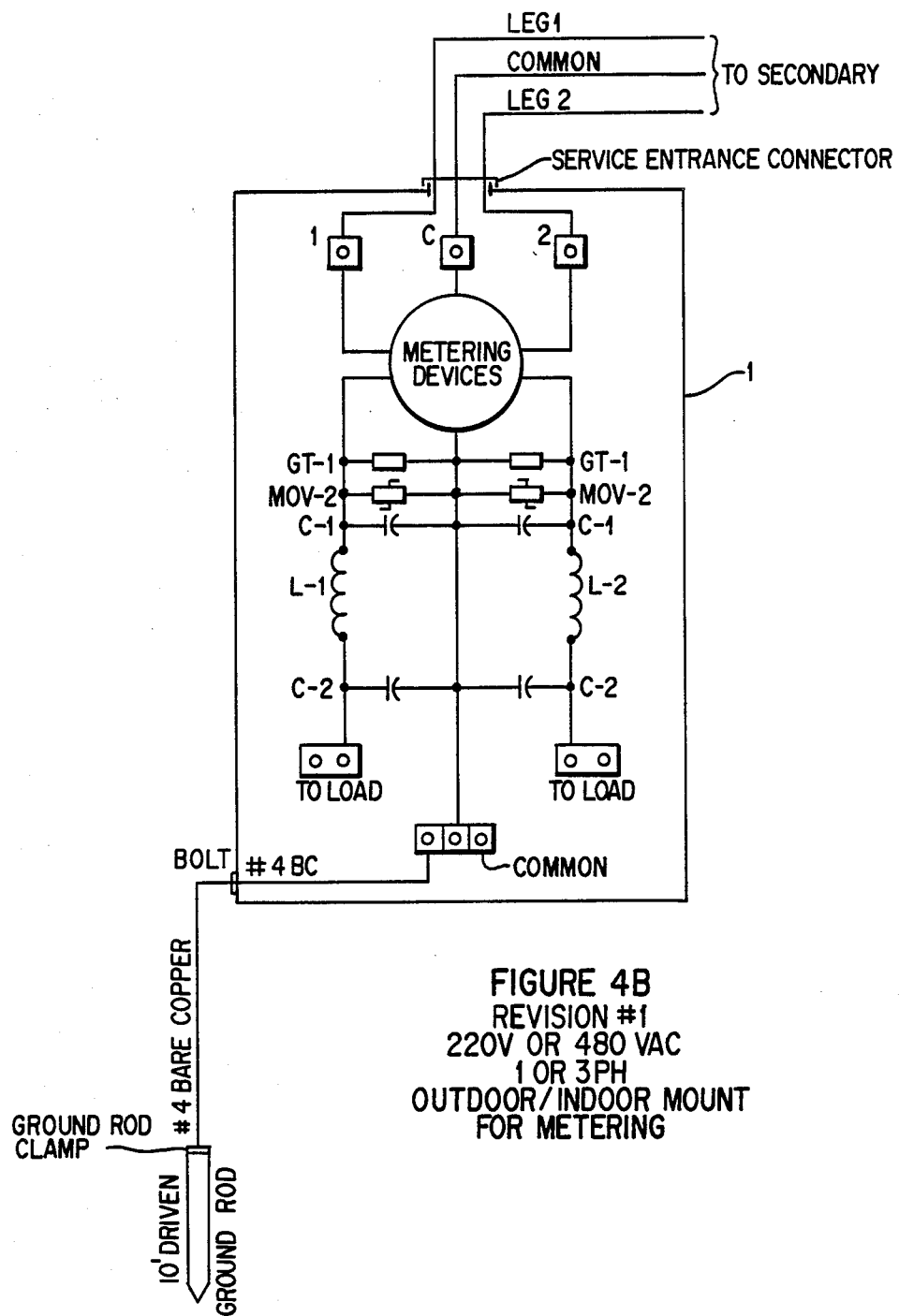

A.C.-D.C. SPIKE ELIMINATING BANDPASS FILTER

BACKGROUND OF THE INVENTION

1. Field of the Invention

This invention concerns the elimination of voltages not in the Bandpass of the filter, A.C. or D.C. voltages.

The proliferation in the use of integrated circuits in home controls and electronics, telecommunications, commercial and industrial controls, and the computer field has resulted in the desirability of a circuit that will eliminate transient spikes and suppress over-voltages that destroy IC's. This invention provides such a circuit. It also has the capability of passing audio, Tip and ring voltages, data transmission and touch tone frequencies for both the input phone lines and the output phone lines and remotes of a PBX and other systems. The circuit removes over-voltages caused by lightning strike and man-made equipment.

2. Background Art

Crosby et. al. utilizes a series tuned circuit comprised of 2 capacitors 5 & 6 and 2 inductors L7 & L8. A series tuned circuit has a lower Q of resonance and a wider Bandpass than the Pi Network used in our circuit, which demonstrates a high Q and sharp slopes to cutoff of Bandpass voltages. To bleed-off the over-voltage we use a minimum of 4 caps and 2 inductors, MOV's and gas charge tubes as voltage reducers. There is no need for current limiting as the load will only pull the current consumed normally.

SUMMARY

My high Q, narrow Bandpass filter acts as a spike eliminator of lightning strike spikes which have higher frequency components. The gas discharge tube voltage limiters and MOV's reduce the voltage level required to protect our bypass capacitors from over-voltage. As a practical matter, a Micro-Second (10-6) is about the best response time achievable with known transient surge suppression devices which includes gas discharge tube, MOV's, Zener diodes and other solid state devices. The Bandpass Filter stops voltages out of Passboard frequencies. This prevents spikes from reaching the load. The Bandpass Filter's high impedance stops the transient spike to allow the voltage rise and removal of the over-voltage by the MOV. The MOV operates at 121% above normal line voltage. My capacitors are set up for voltage rise to the MOV activation plus a safety margin. This insures repeat performance and longer circuit life.

BRIEF DESCRIPTION OF THE DRAWINGS:

FIG. 4B is a construction schematic of the service entrance and meter socket mounting system of the home commercial protection circuit of the present invention.

DESCRIPTION OF THE PREFERRED EMBODIMENT

Figure 1:
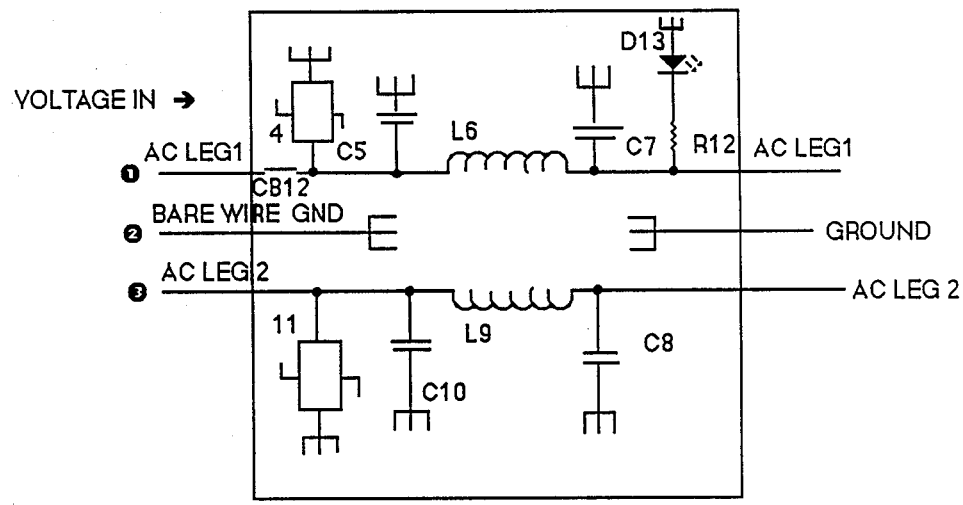
FIG. 1 is a circuit schematic showing one embodiment of the fixed, portable and mobile protection circuit of the present invention.

Referring to the drawings wherein like reference characters are used for like parts throughout, there is illustrated in FIG. 1 a 117 VAC 1 phase live line with bare wire ground and L1 & L2 supply A.C. voltage. Connected in series with L1 is a circuit breaker CB12 rated for load limit. A MOV 4 limits voltage. Capacitors C-5 & C-7 with inductor L6 form a Bandpass filter that prohibits passage of spikes. A resistor R12 and LED D13 form indicating circuit, Leg 2 the return line is a duplication of Line 1 less the indicating circuit. Capacitors C10 & C8 with inductor L9 form a Bandpass filter. All MOV's and capacitors go to ground with inductors in series with line to form Bandpass filter. Valves determine cutoff of frequency Bandpass filter.

Figure 2:
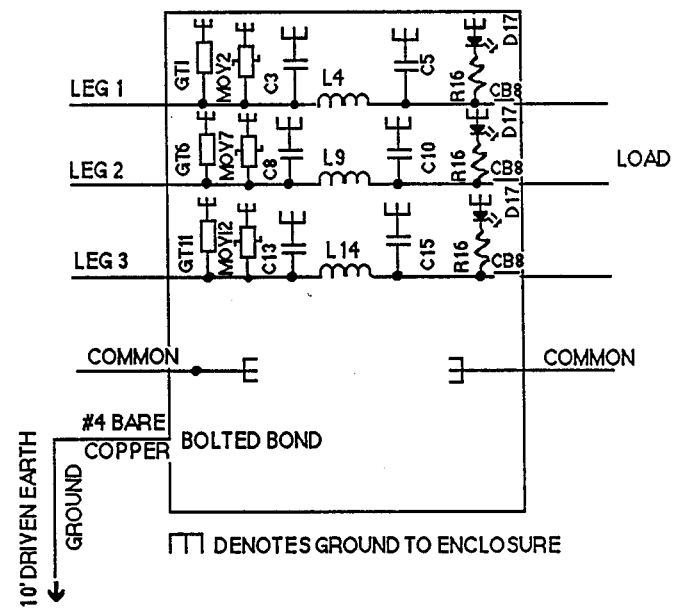
FIG. 2 is a circuit schematic of an embodiment of a fixed 230 VAC 3 phase protection circuit of the present invention.

Referring now to FIG. 2, Bandpass Spike Eliminator Filter, (1) Leg 1, Leg 2 and Leg 3 are hot lines with a; (2) Common; (3) Bonded Earth Ground; (4) which can be connected to 220 VAC 3 Phase AC Power Source. A first Gas Tube GT-1 is connected between hot line Leg 1 and Ground; (2) a Metal Oxide Varistor Mov-2 connected between hot line Leg 1 and ground after GT-1; (3) Capacitor C-3 connected between hot line Leg 1 after MOV-2; (4) an inductor L-4 is connected in series with hot line Leg 1 after C-3; (5) a second capacitor C 5 is connected from hot line Leg 1 to ground after the inductor; (6) Resistor R-16 connected from hot line Leg 1 to (7) a LED D17 that is series connected with R-16 LED D-17 is connected to ground; (8) A circuit breaker is connected in series with hot line Leg 1 breaker rated for load on Leg 1. Leg 2 and 3 are duplicates of Leg 1 Circuit Breakers to be rated at Leg load. (9) A $\frac{5}{8}''$ solid ground rod driven 10 feet in earth is connected to the Metal enclosure that the bandpass filter is built into using a $\frac{1}{4}''$ bolt washer and nut fasten #4 solid copper wire to ground rod using a standard ground rod clamp.

Figure 3:
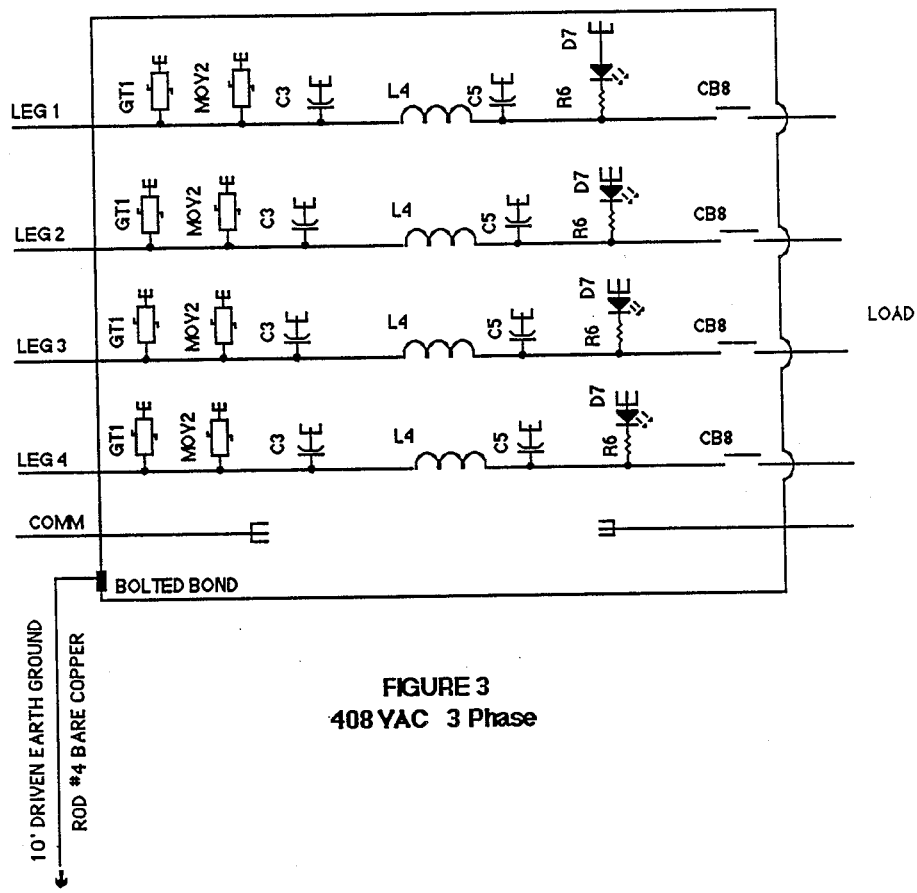
FIG. 3 is a circuit schematic of an embodiment of a fixed 408 VAC 3 phase protection circuit of the present invention.
Figure 4A:
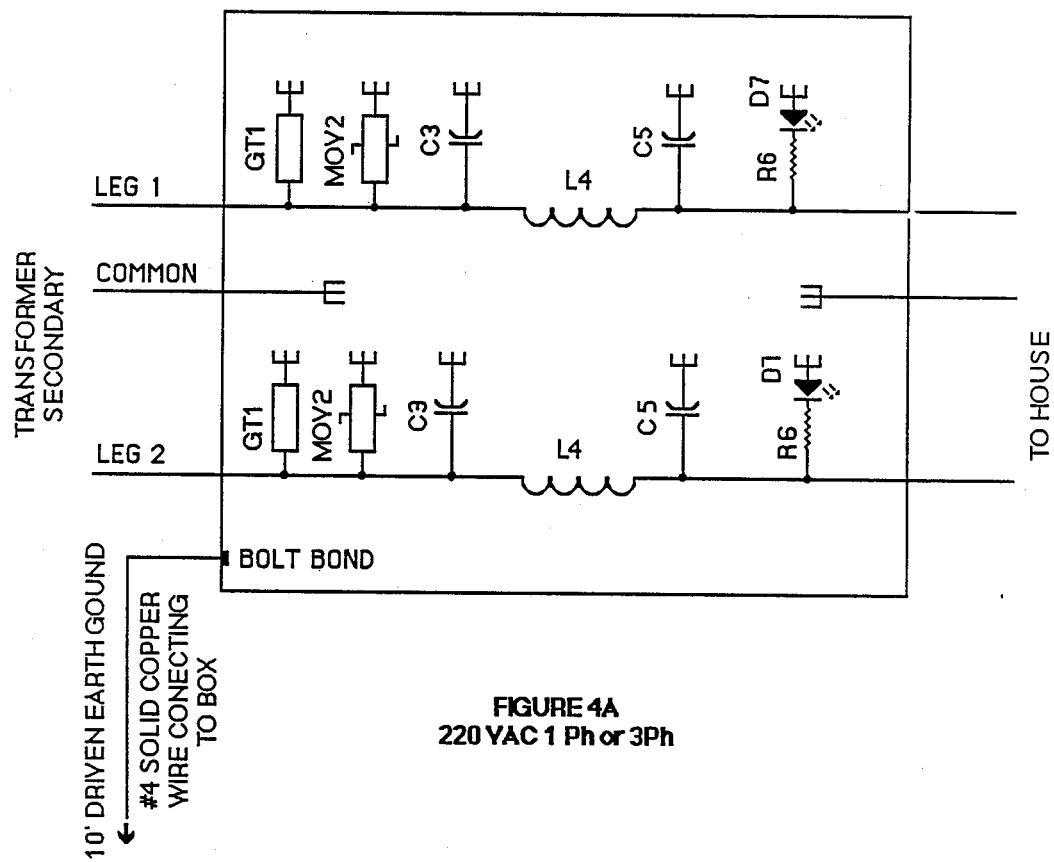
FIG. 4A is a circuit schematic of an embodiment of a fixed secondary protection circuit of the present invention.

Component values vary depending on the frequency that you wish to be the the center of the Bandpass and voltage. FIG. 3 a 408 VAC 3 phase Bandpass Filter components values for voltages and load to meet requirements of each leg. FIG. 4A and 220 VAC 1 phase Bandpass Filter component values for voltage and load to meet requirements of each leg. FIG. 4B a 230 VAC or more any phase outdoor secondary connecting system with built-in meter socket and other electronic equipment with Bandpass Filter, enclosed in a rain tight housing 2. Components depend on line voltage, phase and leg load. FIG. 1 is a 117 VAC and lesser voltage values Bandpass Filter. This unit can be used to prevent voltage spikes and EMP ater units in FIGS. 2, 3, 4A and 4B where equipment is more than a few or built into the cabinet of equipment housing electronic equipment of all types.

I claim:

1. A voltage spike eliminator for A.C. or D.C. voltage lines being used in power systems, audio, video, telecommunication and computers; comprising a Bandpass Filter having two capacitors and an inductor in both hot and return or neutral lines of a 117 VAC single phase system; an input consisting of said hot and neutral lines and earth ground; a first varistor connected between the hot line and earth ground; a second varistor connected between neutral and earth ground; said Bandpass Filter being connected as follows, first capacitor connected between the hot line and earth ground after the first varistor, a second capacitor connected between the neutral line and earth ground after the second varistor, a first inductor connected in series with the hot line after the first capacitor, a second inductor connected in series with the neutral line after the second capacitor, a third capacitor connected between the hot line and earth ground after the first inductor, and a fourth capacitor connected between the neutral line and earth ground after the second inductor; a resistor and light means connected to said hot line and ground for power indication and a circuit breaker connected in series with said hot leg.

2. A 3-phase spike eliminator for A.C. or D.C. voltage lines being used in power systems comprising a Bandpass Filter having two capacitors and an inductor in all hot lines only; an input consisting of said hot lines and earth ground; a first gas tube connected between the hot line and earth ground; a first varistor connected between the hot line and earth ground after the gas tube; said Bandpass Filter being connected as follows, a first capacitor connected between hot line and earth ground after the first varistor, a first inductor connected in series with said hot line after the first capacitor, a second capacitor connected between the hot line and earth ground after the first inductor; a resistor series connected to light means between said hot line and earth ground for power indication and a circuit breaker connected in series with said hot leg; Neutral is common to earth ground.

3. A 220/240 VAC single phase spike eliminator for A.C. or D.C. voltage lines being used in power systems; a Bandpass Filter having two capacitors and an inductor in hot lines only; an input consisting of said hot lines and earth; a first gas tube connected between a hot line and earth ground; a first varistor connected between the hot line and earth ground after the first gas tube; said Bandpass Filter being connected as follows, a first capacitor connected to said hot line after the first varistor, a first inductor connected in series with the hot line after the first capacitor, a second capacitor connected to said hot line and earth ground after the inductor; a resistor and light means series connected to said hot line and earth ground for power indication with no circuit breaker in line.

4. A 220/240/480 single or 3-phase in or outdoor, ahead or after the Utility Company meter, mounting and construction etc. a spike eliminator for A.C. or D.C. voltage lines being used in electrical service connections; comprising a rain tight housing containing a Bandpass Filter having two capacitors and an inductor in hot lines only; an input consisting of said hot lines and earth ground; a first gas tube connected between a hot line and earth ground; a first varistor being connected between said hot line and earth ground; said Bandpass Filter being connected as follows, a first capacitor being connected between said hot line and earth ground, after the first varistor, a first inductor connected in series with said hot line, after the first capacitor, a second capacitor connected between said hot line and earth ground, after the first inductor.

* * * * *